United States Patent [19]

Messing et al.

[11] Patent Number: 4,585,800

[45] Date of Patent: Apr. 29, 1986

[54] PROCESS FOR PREPARING ANION EXCHANGE RESINS BY AMINATION OF HALOALKYLATED POLYMERS IN THE PRESENCE OF METAL HALIDE AND METAL HYDROXIDE

[75] Inventors: Sheldon H. Messing; Marylu B. Gibbs; Alan C. Kott, all of Midland, Mich.

[73] Assignee: The Dow Chemical Company, Midland, Mich.

[21] Appl. No.: 612,977

[22] Filed: May 23, 1984

[51] Int. Cl.$^4$ ............................................... L08D 5/20
[52] U.S. Cl. ........................................ 521/31; 525/379
[58] Field of Search ................... 521/31, 32; 525/379

[56] References Cited

U.S. PATENT DOCUMENTS 4,207,398  6/1980  Riener ..................................... 54/31
4,321,331  3/1982  Widiger, Jr. et al. ............... 525/379
4,399,235  8/1983  Raley, Jr. et al. ..................... 521/31

FOREIGN PATENT DOCUMENTS 7802726  10/1979  France ..................................... 54/31

Primary Examiner—Joseph L. Schofer
Assistant Examiner—Peter F. Kulkosky

[57] ABSTRACT

Anion exchange resins having improved anion capacity are prepared using an improved process whereby the reaction medium can be re-employed. The process comprises contacting a haloalkylated copolymer particle with a compound capable of displacing the halogen of the haloalkyl functionality (e.g., dimethylamine) in a reaction medium (e.g., water). Optionally, an ionizable electrolyte is incorporated into the reaction medium. After preparation of anion exchange resins, the reaction medium containing ionizable electrolyte is re-employed in preparing anion exchange resins.

10 Claims, No Drawings

PROCESS FOR PREPARING ANION EXCHANGE RESINS BY AMINATION OF HALOALKYLATED POLYMERS IN THE PRESENCE OF METAL HALIDE AND METAL HYDROXIDE

BACKGROUND OF THE INVENTION

The present invention relates to ion exchange resins, and in particular, to a process for preparing such resins.

Copolymer particles or beads prepared from polymerized monomers of mono- and poly-ethylenically unsaturated monomers are converted to anion exchange resins or beads using various techniques. For example, weak base resins can be prepared by haloalkylating poly(vinyl aromatic)copolymer beads and subsequently functionalizing the haloalkylated copolymers.

Methods for haloalkylating crosslinked addition copolymers, as well as haloalkylating agents included in such methods are disclosed, for example, in U.S. Pat. Nos. 2,642,417; 2,960,480; 2,597,492; 2,597,493; 3,311,602 and 2,616,817 and Ion Exchange by F. Helfferich, published in 1962 by McGraw Hill Book Co., New York, all of which are incorporated herein by reference. Typically, the haloalkylating reaction involves swelling the crosslinked addition copolymer (e.g., crosslinked polystyrene) with a haloalkylating agent (e.g., bromomethylmethyl ether, chloromethylmethyl ether, or a mixture of formaldehyde and hydrochloric acid) and reacting the mixture in the presence of a Friedel-Crafts catalyst such as zinc chloride, iron chloride and aluminum chloride.

Generally, ion exchange beads are prepared from the haloalkylated bead by contacting said bead with a compound capable of displacing the halogen of the haloalkyl group and which, upon reaction, forms an active ion exchange group. Such compounds and methods for preparing ion exchange resns therefrom (i.e., weak base resins and strong base resins) are well known in the art and U.S. Pat. Nos. 2,632,000; 2,616,877; 2,642,417; 2,632,001; 2,992,544 (all of which are hereby incorporated by reference) and F. Helfferich supra are illustrative thereof. Typically, a weak base resin is prepared by contacting the haloalkylated copolymer with ammonia, a primary amine or a secondary amine, or polyamines such as ethylene diamine, propylene diamine, and the like. Representative primary and secondary amines include the methyl amine, ethyl amine, butyl amine, cyclohexyl amine, dimethyl amine, diethyl amine and the like, as well as various polyamines. Strong base ion exchange resins are prepared using tertiary amines such as trimethyl amine, triethyl amine, tributyl amine, dimethylisopropanol amine, ethylmethylpropyl amine, dimethylamino ethanol, or the like as aminating agents.

Amination generally comprises heating a mixture of the haloalkylated copolymer beads and at least a stoichiometric amount of the aminating agent, (i.e., ammonia or the amine) to a temperature sufficient to displace the halogen atom attached to the carbon atom α to the aromatic nucleus of the polymer with aminating agent. A reaction medium such as water, ethanol, methanol, methylene chloride, ethylene dichloride, dimethoxymethylene, or combinations thereof is optionally, but advantageously employed. Conventionally, amination is carried out at conditions such that anion exchange sites are uniformly dispersed throughout the entire bead.

Unfortunately, known processes for preparing anion exchange resins do not efficiently and effectively provide as high capacity resins as would be desirable. In view of this deficiency, it would be highly advantageous to provide an improvement in the process for preparing anion exchange resins, and the product prepared therefrom having a high anion capacity and particularly a high weak base capacity.

SUMMARY OF THE INVENTION

The present invention is an improved process for producing anion exchange resins, said process comprising providing copolymer particles having haloalkylated functionalities and contacting said copolymer with a compound capable of displacing the halogen of the haloalkyl functionality in a suitable reaction medium under reaction conditions suitable to provide an active anion exchange group and an ionizable electrolyte, wherein said reaction medium containing the ionizable electrolyte is further employed as the reaction medium in the production of anion exchange resins, as described hereinbefore.

In one aspect of this invention, the ionizable electrolyte is placed in contact with the reaction medium containing the copolymer particles having haloalkylated functionalities and the compound capable of displacing the halogen of the haloalkyl functionality prior to the point at which substantial displacement of halide from the haloalkylated functionalities occurs. Additional ionizable electrolyte is provided as a result of the displacement of the halogen of the haloalkyl functionality of the copolymer and the presence of cations in the reaction medium.

Thus, in another aspect of this invention, the ionizable electrolyte is provided as a result of the displaced halogen of the haloalkyl functionalities of the copolymer and the presence of cations in the reaction medium.

The present invention is also compositions prepared using the process of this invention.

The process of this invention allows the skilled artisan to provide high capacity anion exchange resins. Of particular interest is the production of weak base resins, and especially, weak base macroporous resins where the weak base component of the resin can be maximized.

The process of this invention provides the skilled artisan with an efficient and effective means for preparing anion exchange resins. In particular, as the reaction medium is recycled, unreacted materials (e.g., amines) present in the reaction medium are subjected to conditions of reuse. Thus, raw material loss is reduced.

DETAILED DESCRIPTION OF THE INVENTION

Copolymer particles useful in this invention are advantageously those prepared from suspension polymerizable ethylenically unsaturated monomers. Suitable copolymer particles and methods of preparation of such are disclosed in U.S. Pat. Nos. 4,444,961; 3,716,482; 3,549,562; 4,382,124; 4,104,209; 4,419,245 and 3,418,262; which are incorporated herein by reference.

The copolymer particles are haloalkylated using generally known techniques. Such methods for haloalkylating copolymer particles, haloalkylating agents, and the like are disclosed in the aforementioned U.S. Pat. Nos. 2,642,417; 2,960,480; 2,597,492; 2,597,493; 3,311,602 and 2,616,817, as well as F. Helfferich, supra.

The reaction medium can vary and is any medium which the resulting ion exchange resin bead can be separated from while allowing for functionalization of the ion exchange resin. Preferably, the reaction medium is one in which the resulting metal halide salt is soluble in a functionally effective amount as defined hereinafter. Examples of suitable reaction medium constituents include aqueous liquids, ethanol, methanol, methylene chloride, ethylene dichloride, dimethoxy methylene, and the like, or combinations thereof.

The compound capable of displacing the halogen of the haloalkyl functionality of the copolymer particle can be one which provides a weak base resin or a strong base resin. Preferably, it is desirable to provide weak base resins using the process of this invention. Typical compounds are disclosed hereinbefore.

Ionizable electrolytes useful in the process of this invention include those which exhibit a functionally effective solubility in the reaction medium. In particular, the ionizable electrolyte is soluble in an amount suitable to provide an amount of dissolved electrolyte to affect the solubility of the compound capable of displacing the halogen of the haloalkyl functionality in the reaction medium. Representative ionizable electrolytes include sodium chloride, potassium chloride, magnesium chloride, aluminum chloride, ammonium chloride, sodium bromide, sodium iodide, sodium nitrate, sodium sulfate, magnesium sulfate, and the like.

The process of this invention involves dispersing the haloalkylated copolymer particles in the reaction medium. In one aspect, a functionally effective amount of ionizable electrolyte is added to the reaction medium. To the suspension is contacted the compound capable of displacing the halogen of the haloalkyl functionality of the copolymer particle. The reaction is commenced and completed, and product is isolated using techniques known in the art. It is frequently desirable to incorporate into the reaction mixture a metal hydroxide such as sodium hydroxide, potassium hydroxide, etc., (i.e., in order to provide a source of cations to the reaction medium) which acts to provide further ionizable electrolyte (e.g., the metal halide salt). The reaction medium is then recycled, whereby suitable amounts of haloalkylated copolymer, additional compound capable of displacing the halogen of the haloalkyl functionality of the copolymer, and optionally additional metal hydroxide is added to the medium. As the reaction medium is recycled, a buildup of precipitated salt can occur. This precipitated salt can be removed from the reaction system if desired.

The following examples are presented to further illustrate but not limit the scope of this invention. All parts and percentages are by weight unless otherwise indicated.

EXAMPLE 1

The following amination is performed on 420 g of wet, chloromethylated, macroporous, styrene-divinylbenzene copolymer. The chloromethylation of the styrene-divinylbenzene copolymer is accomplished by known methods in ion exchange technology. The wet mass contains 144 g of water and 276 g of what is believed to be totally chloromethylated copolymer. The above mass is charged to a three-liter pressure reactor along with the following: 308 g of water, 96 g of dimethylamine, 72 g of sodium hydroxide, and 100 g of sodium chloride. The mixture is stirred and heated to 90° C. for five hours. The reactor is then cooled, and the contents of the reactor are emptied. The resin is analyzed according to standard methods used for determining ion exchange capacities. The addition of sodium chloride is unnecessary if the liquor used is being recycled from a previous amination. The liquor contains substantial amounts of dissolved sodium chloride.

For comparison purposes, sodium chloride is left out of the reaction mixture and the reaction is performed as described above.

The results of the two samples are indicated in Table I following.

TABLE I

| Capacity | Sample of Invention | Comparative Sample |
|---|---|---|
| Dry Weight (meq./gm) | 5.22 | 4.94 |
| Weak Base (meq./ml) | 1.62 | 1.49 |
| Strong Base (meq./ml) | 0.15 | 0.22 |
| Total (meq./ml) | 1.77 | 1.71 |
| Water retention (Percent) | 45.8 | 47.3 |

The data in Table I indicates that the sample prepared using the process of the invention exhibits a significant increase in weak base capacity over that comparative sample. The dry weight capacity of the sample of this invention is significantly improved over that of the comparative sample.

What is claimed is:

1. An improved process for producing anion exchange resins, said process comprising providing addition copolymer particles having haloalkylated functionalities and contacting said copolymer and a source of cations with an aminating compound capable of displacing the halogen of the haloalkyl functionality in a suitable reaction medium under reaction conditions suitable to provide an active anion exchange group and an ionizable electrolyte, wherein the source of cations is a metal hydroxide and ionizable electrolyte is a metal halide and wherein said reaction medium containing the ionizable electrolyte is further employed as the reaction medium in the production of anion exchange resins, as described hereinbefore.

2. A process of claim 1 wherein the anion exchange resin is a weak base resin.

3. A process of claim 2 wherein the anion exchange resin is a macroporous resin.

4. A process of claim 1 wherein the reaction medium is an aqueous liquid.

5. A process of claim 1 wherein the ionizable electrolyte is placed in contact with the reaction medium containing the copolymer particles having haloalkylated functionalities, the source of cations and the compound capable of displacing the halogen of the haloalkyl functionality prior to the point at which substantial displacement of halide from the haloalkylated functionalities occurs.

6. A process of claim 5 wherein the anion exchange resin is a weak base resin.

7. A process of claim 6 wherein the anion exchange resin is a macroporous resin.

8. The process of claim 5 wherein the reaction medium is an aqueous liquid.

9. The process of claim 1 wherein the metal hydroxide is sodium hydroxide and the metal halide is sodium chloride.

10. The process of claim 5 wherein the metal hydroxide is sodium hydroxide and the metal halide is sodium chloride.

* * * * *